United States Patent [19]

Fort et al.

[11] Patent Number: 5,299,597
[45] Date of Patent: Apr. 5, 1994

[54] VALVE OPERATING HANDLE

[75] Inventors: Edward S. Fort, Clitheroe; Alan G. Smithson, Wetheral, both of England

[73] Assignee: Fort Vale Engineering Limited, England

[21] Appl. No.: 754,506

[22] Filed: Sep. 3, 1991

[30] Foreign Application Priority Data

Aug. 31, 1991 [GB] United Kingdom ............... 9019076

[51] Int. Cl.⁵ ....................... F16K 35/02; F16K 35/06
[52] U.S. Cl. ........................ 137/385; 251/96; 70/180; 70/203; 70/212
[58] Field of Search ............... 251/93, 95, 96, 98, 251/99, 101, 103, 107, 108, 109, 114, 116; 137/385; 70/175, 176, 177, 180, 203, 212

[56] References Cited

U.S. PATENT DOCUMENTS

| | | | |
|---|---|---|---|
| 834,429 | 10/1906 | Wiggs | 137/385 |
| 1,395,678 | 11/1921 | Jones | |
| 1,967,309 | 7/1934 | Hume | 251/165 |
| 2,065,750 | 12/1936 | Safford | 251/99 |
| 2,147,287 | 2/1939 | Farmer | 251/109 |
| 2,541,073 | 2/1951 | Kaufman | 251/115 |
| 2,690,321 | 9/1954 | Luna et al. | 251/116 |
| 2,741,138 | 4/1956 | Russell | 74/531 |
| 2,852,225 | 9/1958 | Klingler | 251/109 |
| 2,899,169 | 8/1959 | Klingler | 251/107 |
| 3,016,226 | 1/1962 | Freeman | 251/109 |
| 4,208,033 | 6/1980 | Kesterman | 251/95 |
| 4,747,427 | 5/1988 | Smith et al. | 251/101 |
| 4,909,275 | 3/1990 | Massey et al. | 137/385 |
| 5,069,421 | 12/1991 | Kishi et al. | 251/99 |

FOREIGN PATENT DOCUMENTS

| | | |
|---|---|---|
| 1831463 | 5/1961 | Fed. Rep. of Germany . |
| 1188395 | 3/1965 | Fed. Rep. of Germany . |
| 53311 | 10/1910 | Switzerland . |
| 988505 | 4/1965 | United Kingdom . |

Primary Examiner—George L. Walton
Attorney, Agent, or Firm—Gipple & Hale

[57] ABSTRACT

A handle assembly for operating a valve of the type having a valve body and a pivotally mounted actuating spindle extending from the valve body has a mounting means to secure the assembly to the spindle, a handle portion connected to the mounting means and a pivotally mounted locking member. The locking member is pivotable, either by camming surfaces on the handle portion and the locking member or by a key, between a first, locked position in which it engages with a portion of the valve body, and a second, unlocked position in which it is free from the valve body and enables the valve spindle to be rotated by the handle portion.

The locking member is provided with a number of apertures which can be aligned with corresponding apertures in the mounting means and the handle portion when the locking member is in its locked position. The apertures are shaped to receive tamper-sensitive tape or wire or the shackle of a padlock, to indicate or prevent unauthorized use of the value.

19 Claims, 2 Drawing Sheets

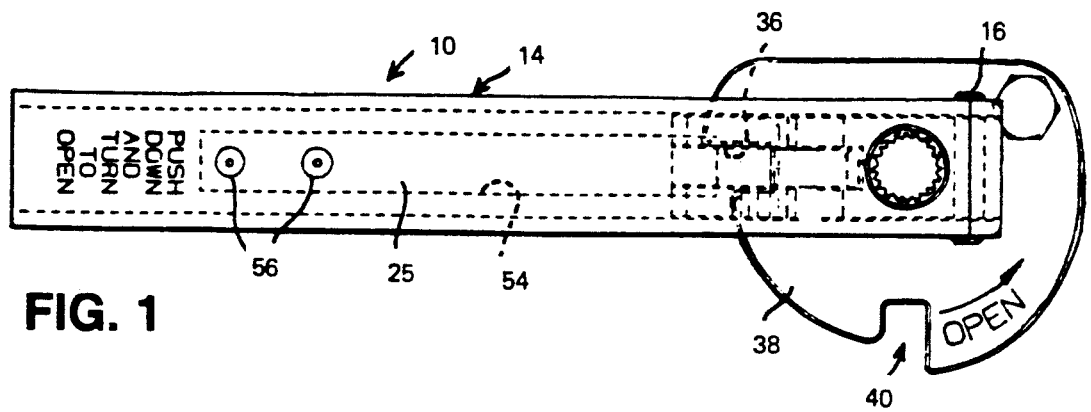
FIG. 1
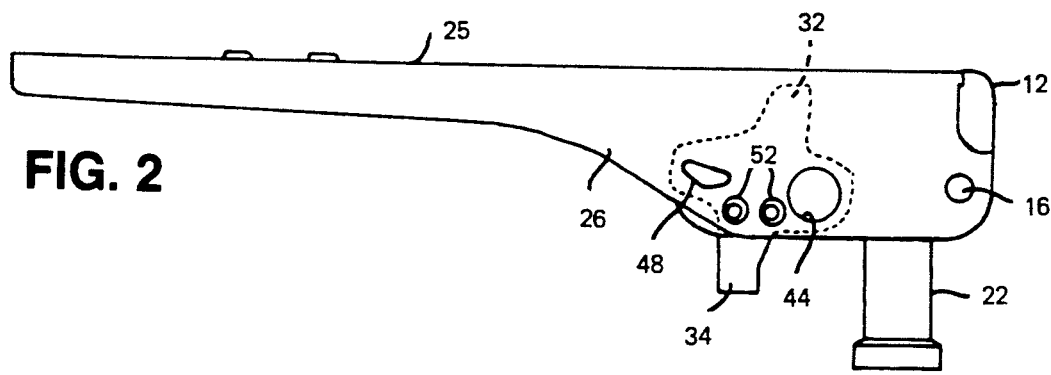
FIG. 2
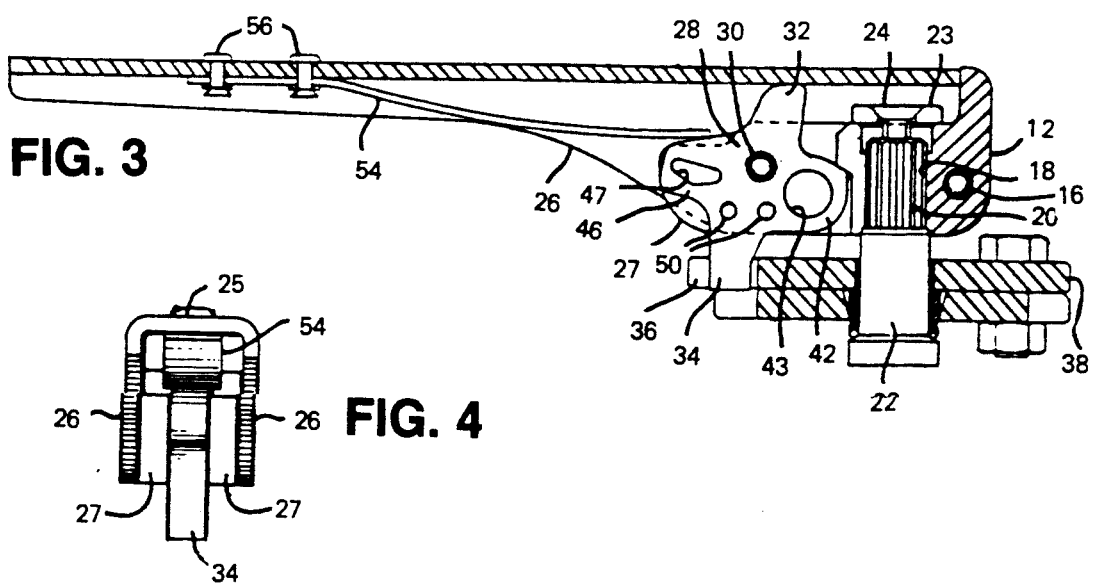
FIG. 3
FIG. 4

VALVE OPERATING HANDLE

DESCRIPTION

The present invention relates to handles for operating valves, and in particular, but not exclusively, to handles for operating valves controlling the discharge of flowable materials.

When it is desired to discharge material such a fluid from a storage tank, the flow of material is regulated by means of a valve connected to an outlet at the base of the tank. Typical valves comprise a valve closure member engageable with, and displaceable away from, its valve seat by means of an actuating handle mounted on a spindle which is pivotally connected to the valve body. In order to prevent inadvertent operation of the valve, there is preferably some means of retaining the actuating handle in the open or closed positions. This may take the form of a spring-loaded pin which is releasably engageable with apertures corresponding to the fully open and fully closed position of the valve, such that the pin must be withdrawn manually in order to allow movement of the handle. Alternatively, there may be a lever pivotally mounted on the handle which is squeezed in order to withdraw a locking member from its associated aperture.

In addition, it may be necessary to prevent unauthorized operation of the valve, and/or to apply a seal for confirming that discharge of the product has not occurred. Typically, unauthorized operation of the valve may be prevented by means of a padlock whose shackle can pass through aligned apertures in lugs secured to the handle and the valve respectively. The disadvantage of this is that the manufacture of different securing arrangements is necessary for left-and right-handed valves, since it is important that there should be economical use of space on the discharge side of the valve. This means that the flanges through which the shackles of the padlock must pass must be located between the valve and the tank, which necessarily results in a gap between the tank and the valve. This is particularly unacceptable if the material in the tank is sludgy or pasty, since the material may congeal in the conduit linking the tank and the valve.

Also, problems arise in applying seals to such handles. Typically, the seals comprise a wire or tape which is passed through aligned apertures in the handle and in a flange connected to the valve body, the free ends of the wire or tape being secured with a seal. However, it is possible in some circumstances to operate the valve (usually resulting in considerable damage thereto) without breaking the seal.

It is an object of the present invention to provide a valve operating handle which overcomes some or all of the above disadvantages.

SUMMARY OF THE INVENTION

In accordance with a first aspect of the present invention, a valve operating handle comprises means for securing the handle to a valve actuating spindle, a locking member pivotally mounted on the handle and pivotable between a first, locked, angular position in which it is engageable with an associated recess on or connected to the valve body in order to prevent rotation of the valve spindle by means of the handle, and a second, unlocked, angular position in which the securing lug is displaced out of the recess to enable the handle to rotate the spindle in order to actuate the valve.

Such a construction prevents inadvertent operation of the valve, since it is first necessary to disengage the locking member before the valve spindle can be pivoted by the handle. Also, the valve is fully "ambidextrous", i.e. its symmetrical construction allows it to be operated in both directions. Also, the handle reduces the likelihood of injury resulting from trapped fingers.

In one embodiment, the handle comprises a base portion connectible to a valve spindle and an actuating portion pivotally mounted on the base portion, the locking member being pivotally mounted on the base portion and the actuating portion and the locking member being provided with interengaging camming surfaces, whereby pivoting of the actuating member causes the locking member to pivot from its locked position.

Such a construction allows single-handed operation of the valve, since it is merely necessary to depress the actuating member to disengage the locking member and then to rotate the handle, thereby actuating the valve.

In another embodiment, the locking member is provided with a recess adapted to receive a complementarily-shaped key, by means of which the locking member may be pivoted. Such a construction enables the valve to be actuated only by those having a suitable key.

There may be means for securing the locking member in a preferred position, e.g. in the locked position. This may comprise a recess or aperture in the locking member which is aligned with a recess in the rest of the handle when the locking member is in a preferred position, e.g. the locked position, and adapted to receive a securing member therethrough in order to resist pivoting of the locking member. The securing member may comprise a security wire or tape or other means which indicates when the locking member has been pivoted, or may comprise means for preventing pivoting, e.g. the shackle of a padlock. There may be a plurality of sets of aligned apertures to allow, for example, both a padlock and a security tape or wire to be affixed.

By having the security wire/tape and padlock securable to the locking member, valve spindle movement is impossible without removing the wire/tape and padlock to enable the locking member to be released. In known designs, in which the wire/tape or padlock were securable to the valve spindle, it is possible to open the valve slightly without first removing the wire/tape or padlock, thereby permitting unauthorized removal. Moreover, the incorporation of the locking action on the locking member provides a compact design with less overhang than known valves having a securing flange connected to the handle. Likelihood of fouling of the handle on the tank is thus greatly reduced.

Preferably, the handle comprises spring means for biassing the locking member into the locked position.

By way of example only, specific embodiments of the present invention will now be described, with reference to the accompanying drawings, in which:

BRIEF DESCRIPTION OF THE DRAWINGS

FIG. 1 is a plan view of a first embodiment of valve operating handle in accordance with the present invention;

FIG. 2 is a side elevation of the valve operating handle of FIG. 1;

FIG. 3 is a longitudinal cross-section through the handle of FIG. 1;

FIG. 4 is an end elevation of the handle of FIG. 1;

DETAILED DESCRIPTION OF THE INVENTION

Figure 5:
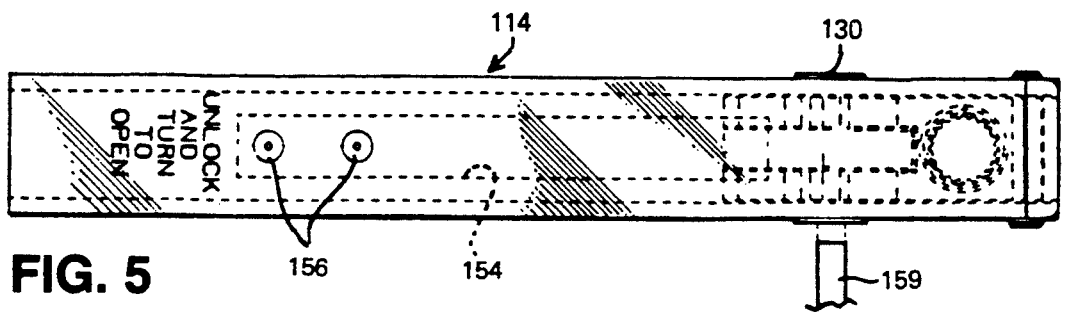
FIG. 5 is a plan view of a second view embodiment of valve operating handle in accordance with the present invention.

Referring firstly to FIGS. 1 to 3, the valve operating handle 10 comprises a base portion 12 and an actuating portion 14 pivotally connected to the base portion 12 by means of a stainless steel pin 16. The base portion 12 of the handle is provided with an internally splined bore 18 which, in use, engages a correspondingly splined end 20 of a valve actuating spindle 22. The base portion is secured on the spindle by means of washer 23, and a countersunk bolt 24 screw-threadedly received in the spindle.

The actuating portion 14 of the handle is stamped from a single piece of metal, and comprises an upper planar portion 25 and two identical side flanges 26 extending downwardly from the planar portion, the depth of the flanges increasing from the free end of the handle towards the base portion 12. The base portion 12 is provided with two parallel mounting lugs 27 extending away from the spindle, and a trigger arrangement 28 is pivotally mounted between the two mounting lugs by means of a transversely extending stainless steel pivot pin 30. The trigger comprises a generally cruciform-shaped member. One arm 32 of the trigger is provided with a camming surface which causes the trigger to pivot clockwise (as seen in FIG. 3) when the actuating portion 14 of the handle is pivoted counter-clockwise about its pivot 16. The opposite arm 34 of the trigger is adapted to engage in a correspondingly-shaped recess 36 of a mounting flange 38 connected to the valve, and through which the valve spindle 22 extends. The arm 34 is adapted to engage with the recess 36 when the position of the actuating handle corresponds to the closed position of the valve, and a further recess 40 is provided with which the arm 34 can engage when the valve is in its fully opened position. A third arm 42 of the trigger is provided with a large aperture 43 adapted to receive the shackle of a padlock, and as seen from FIG. 2 is aligned with corresponding apertures 44 in each of the flanges 26 of the actuating portion 14 of the handle 10 and in the mounting lugs 27. The opposite arm 46 is provided with an elongate recess 47 which is also aligned with corresponding apertures 48 in the flanges of the actuating portion 14 of the handle and in the mounting lugs 27 when the lug 34 is engaged in the recess 36 or 40. Between the padlock hole 42 and the elongate aperture 47 are provided two circular apertures 50 which are also aligned with corresponding apertures 52 in the actuating handle flanges 26 and in the mounting lugs 27.

It will also be noted that the trigger is biassed towards the position in which the arm 34 engages with the recess 36 by means of a leaf spring 54 which is secured to the undersurface of the actuating portion 14 of the handle by means of two pop rivets 56. The counter-clockwise movement of the trigger is limited by engagement of the arm 42 of the trigger with the base portion 12 of the handle.

In use, in order to rotate the valve spindle, it is necessary to depress the actuating portion 14 of the handle, which thereby pivots about the pivot pin 16. The engagement of the undersurface of the actuating portion 14 with the camming surface on the arm 32 of the trigger causes the trigger to rotate clockwise as seen in FIG. 3, against the restoring force of the spring 54. The trigger is thereby rotated such that the arm 34 no longer engages with the recess 36, thus allowing the valve to be operated by angular displacement of the handle and the spindle 22. The handle can also be locked in its open position by displacing the handle through a right angle, whereupon the arm 34 of the trigger engages with the recess 40 when the handle is released, by virtue of the restoring force provided by the leaf spring 34.

When the handle is in the position corresponding to the closed condition of the valve, it will be appreciated that the shackle of a padlock may be passed through the aligned apertures 44 in the parallel flanges 26 of the handle, and through the apertures 43 in the trigger and the mounting lugs 27. If a padlock is secured in this way, pivoting of the trigger will be prevented, thereby retaining the arm 34 within the recess 36, and thereby preventing actuation of the valve. Similarly, security tape (such as TIR tape) may be passed through the aligned apertures 48 in the flanges 26 and the apertures 47 in the trigger and in the mounting lugs 27, or security wire (TIR wire) may be inserted through the aligned apertures 52 in the flanges 26 and one or more of the apertures 50 in the trigger and in the lugs 27, and the free ends of the tape or wire may then be sealed together. Thus, even if it proved to be possible to unlock the valve, any actuation of the valve would cause such security tape or wire to break, thereby indicating that unauthorized actuation of the valve had occurred.

A second embodiment is illustrated in FIGS. 5 to 8, and comprises a base portion 112 having a splined aperture 118 for engagement with the splined end of a valve actuating spindle and an actuating portion 114 which is fixedly (and not pivotally) connected to the base portion 112 by means of a pin 116. In use, a thick washer 123 is inserted between the handle and the base portion, and its abutment with each one prevents any pivoting of the handle.

Figure 7:
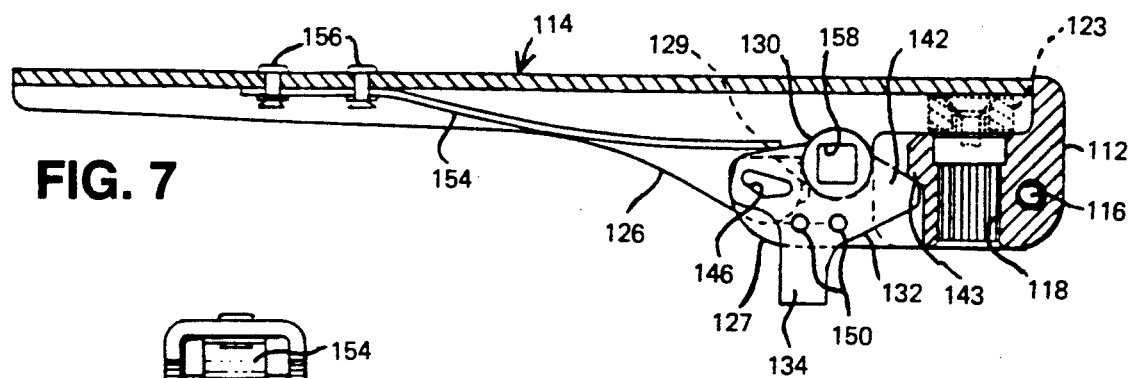
FIG. 7 is a longitudinal cross-section through the handle of FIG. 5.
Figure 8:
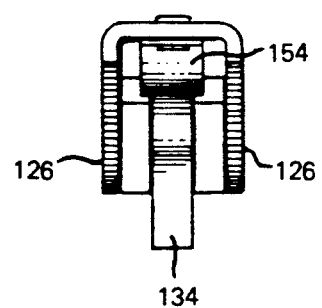
FIG. 8 is an end view of the handle of FIG. 5.

As in the first embodiment, the actuating portion 14 is provided with downwardly-depending edge flanges 126. However, as shown in dotted lines in FIG. 7, the left-hand flange 126 is provided with a recess 129 extending upwardly from the bottom edge of the flange. As in the first embodiment a trigger 132 is pivotally mounted on a pin 130 between two mounting lugs 127 of the base portion 112. In contrast to the first embodiment, the arm 32 having the camming surface is dispensed with, since the actuating portion 14 is no longer pivotally mounted to the base portion. Instead, the trigger comprises three arms, a first arm 134 for engagement with either of the recesses 36, 40 as described for the first embodiment, a second arm 142 adapted to engage a lug 143 on the base portion 112 in order to limit its movement in the anticlockwise direction as shown in FIG. 7, and a third arm provided with an elongate aperture 146 adapted to correspond with apertures 148 in the flanges 26 of the handle and in the mounting lugs 127, and adapted to receive security tape as described for the first embodiment. Similarly, the trigger is also provided with two apertures 50 adapted to correspond to apertures 152 in the flanges 26 of the handle and in the mounting lugs 127, and adapted to receive security wire as described for the first embodiment.

Figure 6:
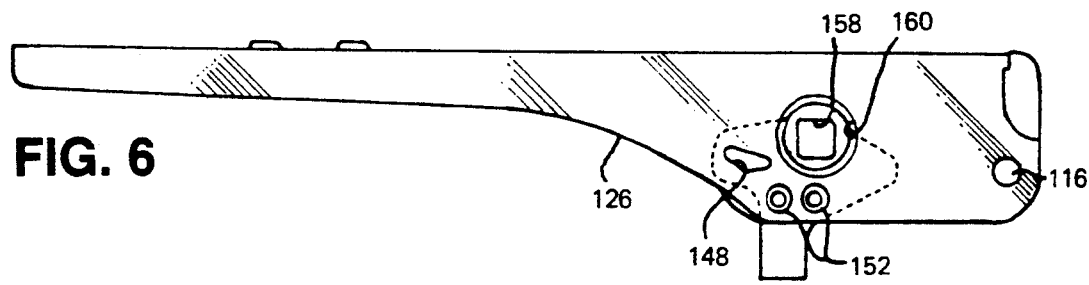
FIG. 6 is a side elevation of the handle of FIG. 5.

It will also be noted that the trigger is biassed towards the position illustrated in full lines in FIG. 7 by means of a leaf spring 154 which is secured to the undersurface of the actuating portion 14 of the handle by means of two pop rivets 156. The pivot 130 upon which the trigger is mounted, and which is pivotally mounted between the two flanges 127 of the base portion 112 of the handle is also provided with a recess 158 which is adapted to receive a complementarily-shaped key and is accessible through an aperture 160 in the flange 126 of the handle. By inserting the key into the recess, the trigger may be rotated about the pivot in a clockwise direction as shown in FIG. 6, against the force of the leaf spring 154, thus withdrawing the arm 134 from its associated recess 36, and allowing the handle to be pivoted in order to operate the valve. As for the first embodiment, when the valve is in its fully open position, if the key is removed then the restoring force of the leaf spring 154 will cause the arm 134 of the trigger to engage in the recess 40 corresponding to the position of the handle when the valve is in the fully open position.

As for the first embodiment, security tape and/or wire may be inserted in the appropriate apertures in order to indicate operation of the valve, since if the trigger is rotated while the security tape or wire is in position in the appropriate apertures the tape or wire will break.

The invention is not restricted to the details of the foregoing embodiments. For example, the second recess 40 for maintaining the valve in its open position may be dispensed with, as a safety measure.

We claim:

1. A handle assembly for operating a valve of the type having a valve body and a pivotally mounted actuating spindle extending from said valve body along a first pivotal axis, the handle assembly comprising:

mounting means to secure said assembly to said spindle;

a handle portion connected to said mounting means;

a locking member with a locking portion, the locking member being disposed entirely under at least a portion of the handle portion adjacent to said spindle and pivotally mounted on said handle portion about a second pivotal axis, positioned at an angle to said first pivotal axis, spring means mounted to said handle portion engaging and biassing said locking member into a locked position with said spindle and said valve body; and means for pivoting said locking member between a first, locked position in which, said locking portion is engaged with an associated locking portion of said valve body, and a second, unlocked position in which said locking portion is displaced from said associated locking portion of said valve body to enable said spindle to be rotated by said handle portion, said locking member and said handle portion each being provided with an aperture, said aperture in said locking member being positioned under said handle portion and aligned with said handle portion aperture when said locking portion is engaged with said associated portion and configured to receive securing means.

2. A handle assembly as claimed in claim 1, wherein said mounting means comprises a base portion to which said handle portion is attached.

3. A handle assembly as claimed in claim 1, wherein said handle portion is pivotally mounted on said mounting means, and said handle portion and said locking member are provided with camming surfaces, said handle portion being provided with a camming surface located on its undersurface whereby pivotal displacement of said handle portion displaces said locking member by engaging a projection of said locking member to assume locked and unlocked positions.

4. A handle assembly as claimed in claim 3, wherein depression of said handle assembly causes movement of said locking member out of said first, locked position.

5. A handle assembly as claimed in claim 1, wherein said locking member is pivotable between said locked and unlocked positions by means of a key member which is releasably engageable with said locking member.

6. A handle assembly as claimed in claim 5, wherein said locking member and said key member are provided with complementarily-fitting portions.

7. A handle assembly as claimed in claim 6, wherein said locking member is provided with a recess adapted to receive a complementarily shaped portion of a key member.

8. A handle assembly as claimed in claim 1, wherein said locking member is pivotally mounted on said mounting means.

9. A handle assembly as claimed in claim 8, wherein said mounting member comprises two lugs, and said locking member is pivotally mounted between said lugs.

10. A handle assembly as claimed in claim 1, wherein said mounting means comprises an aperture shaped to receive and engage said valve spindle.

11. A handle assembly as claimed in claim 1, further comprising biassing means for biassing said locking member towards said locked position.

12. A handle assembly as claimed in claim 11, wherein said biassing means comprises a spring extending between said handle portion and said locking member.

13. A handle assembly as claimed in claim 1, wherein said aligned apertures are shaped to receive tamper-sensitive security tape or wire.

14. A handle assembly as claimed in claim 1, wherein said aligned apertures are adapted to receive a shackle of a padlock.

15. A handle assembly as claimed in claim 1, wherein said handle portion is provided with two lugs which at least partially enclose said mounting means.

16. A handle assembly for operating a valve of the type having a valve body and a pivotally mounted actuating spindle extending from said valve body along a first pivotal axis, the handle assembly comprising:

mounting means to secure said assembly to said spindle;

a handle portion pivotally connected to said mounting means about a second pivotal axis, positioned at an angle to said first pivotal axis;

a locking member with a locking portion, the locking member being disposed entirely under at least a portion of the handle portion adjacent to said spindle and pivotally mounted on said handle portion about a third pivotal axis, also positioned at an angle to said first pivotal axis spring means mounted underneath said handle portion and engaging said locking member; and camming surfaces located on said handle portion and on said locking member, whereby displacement of said handle portion causes its undersurface to engage said camming surface of said locking member causing displacement of said locking portion between a first, locked position in which, said locking portion is engaged with an associated portion of said valve body, and a second, unlocked position in which said locking portion is displaced from said associated portion to enable said spindle to be rotated by said handle portion, said locking member and said handle portion each being provided with an aperture, said apertures being aligned when said locking portion is engaged with said associated portion and configured to receive securing means.

17. A handle assembly for operating a valve of the type having a valve body and a pivotally mounted actuating spindle extending from said valve body along a first pivotal axis, the handle assembly comprising:

mounting means to secure said assembly to said spindle;

a handle portion connected to said mounting means;

a locking member with a locking portion, the locking member being disposed entirely under at least a portion of the handle portion adjacent to said spindle and pivotally mounted on said handle portion underneath said handle portion about a second pivotal axis, positioned at an angle to said first pivotal axis, spring means mounted to said handle portion engaging and biassing said locking member into a locked position; and said locking member being adapted to receive a key member for pivoting said locking member between a first, locked position in which said locking portion is engaged with an associated locking portion of said valve body, and a second, unlocked position in which said locking portion is displaced from said associated locking portion of said valve body to enable said spindle to be rotated by said handle portion, said locking member and said handle portion with respect to which said locking member is pivotable are each provided with an aperture, said apertures being aligned when said locking portion is engaged with said associated locking portion and configured to receive securing means.

18. A handle assembly as claimed in claim 17 wherein said locking member is cruciform shaped.

19. A handle assembly as claimed in claim 18 wherein said locking member defines an aperture to receive a padlock and an aperture to receive a security wire.

* * * * *

UNITED STATES PATENT AND TRADEMARK OFFICE
CERTIFICATE OF CORRECTION

PATENT NO. : 5,299,597
DATED : April 5, 1994
INVENTOR(S) : Edward S. Fort

It is certified that error appears in the above-indentified patent and that said Letters Patent is hereby corrected as shown below:

On the Title Page, item [30] should read:

Foreign Application Priority Data

Aug. 31, 1990 [GB]   United Kingdom...........9019076

Signed and Sealed this

Twenty-third Day of August, 1994

Attest:

BRUCE LEHMAN

Attesting Officer          Commissioner of Patents and Trademarks